(12) United States Patent
de Almeida Silva et al.

(10) Patent No.: US 12,409,581 B2
(45) Date of Patent: Sep. 9, 2025

(54) PROCESS FOR IN-MOLD COATING OF COMPOSITE AIRCRAFT COMPONENTS

(71) Applicant: EMBRAER S.A., São José dos Campos—SP (BR)

(72) Inventors: Rogério de Almeida Silva, São José dos Campos—SP (BR); Edson da Silva Barbosa, São José dos Campos—SP (BR); João Paulo de Araujo Santana, São José dos Campos—SP (BR)

(73) Assignee: EMBRAER S.A., São José dos Campos— SP (BR)

( * ) Notice: Subject to any disclaimer, the term of this patent is extended or adjusted under 35 U.S.C. 154(b) by 220 days.

(21) Appl. No.: 17/978,138

(22) Filed: Oct. 31, 2022

(65) Prior Publication Data
US 2023/0048909 A1 Feb. 16, 2023

Related U.S. Application Data

(63) Continuation-in-part of application No. 16/907,931, filed on Jun. 22, 2020, now abandoned.

(51) Int. Cl.
*B29C 37/00* (2006.01)
*B29C 33/68* (2006.01)
*B29C 70/34* (2006.01)
*B29K 63/00* (2006.01)
*B29L 31/30* (2006.01)

(52) U.S. Cl.
CPC .......... *B29C 37/0032* (2013.01); *B29C 33/68* (2013.01); *B29C 70/342* (2013.01); *B29K 2063/00* (2013.01); *B29L 2031/3076* (2013.01)

(58) Field of Classification Search
CPC ..... B29C 70/54; B29C 70/086; B29C 43/183; B29C 65/44; B29C 41/08; B29C 66/73751
See application file for complete search history.

(56) References Cited

U.S. PATENT DOCUMENTS 3,616,140 A * 10/1971 Copeland ................ B32B 27/32
52/80.1
3,798,105 A * 3/1974 Hannah et al. ............ C08J 5/06
156/310

(Continued)

FOREIGN PATENT DOCUMENTS

CN 109988394 7/2019
CN 110509573 11/2019

(Continued)

OTHER PUBLICATIONS

Extended European Search Report for EP Application No. 21180936. 3, dated Nov. 19, 2021, 9 pages.

*Primary Examiner* — Andrew D Graham
(74) *Attorney, Agent, or Firm* — Nixon & Vanderhye, P.C.

(57) ABSTRACT

Processes for forming fiber reinforced composite aircraft components, i.e., aircraft components formed of a cured fiber-reinforced resin, are provided. According to specific embodiments, a finished surface of the composite aircraft component can be achieved by providing in-mold coating of the cured fiber-reinforced resin by a dried and cured film layer of a water-based primer paint material to thereby achieve a composite aircraft component having an exterior surface that does not necessarily require further finishing.

11 Claims, 6 Drawing Sheets

(56) References Cited

U.S. PATENT DOCUMENTS

| | | | | |
|---|---|---|---|---|
| 4,059,710 A * | 11/1977 | Nishiyama | C23C 18/24 | 264/129 |
| 4,086,378 A * | 4/1978 | Kam | B29D 22/00 | 428/36.1 |
| 4,099,280 A * | 7/1978 | Hoppe | A47K 3/40 | 264/DIG. 83 |
| 4,228,113 A * | 10/1980 | van Gasse | B29C 70/08 | 264/440 |
| 4,315,884 A * | 2/1982 | Van Gasse | B29C 37/0032 | 525/934 |
| 4,316,869 A * | 2/1982 | Van Gasse | B29C 70/0035 | 264/DIG. 57 |
| 4,349,643 A * | 9/1982 | Mohiuddin | C08G 18/16 | 524/561 |
| 4,610,836 A * | 9/1986 | Wycech | B29C 44/386 | 156/196 |
| 4,610,863 A | 9/1986 | Wycech | | |
| 4,681,712 A * | 7/1987 | Sakakibara | B29C 45/14778 | 264/105 |
| 4,695,343 A * | 9/1987 | Wycech | B62D 29/002 | 156/196 |
| 4,804,427 A * | 2/1989 | Paul | C08J 5/06 | 156/181 |
| 4,925,611 A * | 5/1990 | Shockney | B29C 70/08 | 264/225 |
| 5,064,723 A * | 11/1991 | Lawson | C23C 22/00 | 428/209 |
| 5,071,338 A * | 12/1991 | Dublinski | B29C 43/3642 | 425/389 |
| 5,164,127 A * | 11/1992 | Boeckeler | C08J 5/00 | 264/447 |
| 5,217,669 A * | 6/1993 | Dublinski | B29C 43/3642 | 264/258 |
| 5,229,141 A * | 7/1993 | Mozer | B29C 43/3642 | 264/258 |
| 5,242,720 A | 9/1993 | Blake | | |
| 5,266,249 A * | 11/1993 | Grimes, III | B29C 70/44 | 428/116 |
| 5,435,949 A * | 7/1995 | Hwang | B29C 39/021 | 264/220 |
| 5,547,629 A * | 8/1996 | Diesen | B29C 70/086 | 264/258 |
| 5,556,498 A * | 9/1996 | Blanchard | B62D 29/043 | 156/305 |
| 5,707,723 A * | 1/1998 | Harrison | B32B 27/36 | 428/34.7 |
| 5,849,168 A * | 12/1998 | Lutz | B29C 37/0028 | 473/378 |
| 5,885,662 A * | 3/1999 | Gardner, Jr. | B29C 39/126 | 428/319.3 |
| 6,045,732 A * | 4/2000 | Nakatsuji | B29C 43/183 | 264/46.4 |
| 6,214,261 B1 * | 4/2001 | Smarto | B29C 70/76 | 156/107 |
| 6,544,449 B1 * | 4/2003 | Gardner | B29C 67/246 | 264/46.4 |
| 6,699,419 B1 * | 3/2004 | Kia | B29C 37/0032 | 264/225 |
| 7,228,611 B2 * | 6/2007 | Anderson | B29C 33/68 | 156/286 |
| 7,527,222 B2 * | 5/2009 | Bjornstad | B29C 53/587 | 244/119 |
| 8,182,640 B1 * | 5/2012 | Boone | B29C 35/02 | 264/516 |
| 9,144,959 B1 * | 9/2015 | Rotter | B29C 31/08 | |
| 9,211,679 B1 * | 12/2015 | Metschan | B29C 70/34 | |
| 2003/0035961 A1 * | 2/2003 | Tomokuni | B29C 70/086 | 264/308 |
| 2004/0164460 A1 * | 8/2004 | Hirota | B29C 37/0032 | 264/328.16 |
| 2004/0185733 A1 * | 9/2004 | Murai | B29C 70/48 | 264/129 |
| 2004/0192137 A1 * | 9/2004 | Starkey | B29C 70/086 | 442/394 |
| 2004/0231790 A1 * | 11/2004 | Hou | C08J 5/12 | 156/308.2 |
| 2005/0161861 A1 * | 7/2005 | Lammers | B29B 11/16 | 425/375 |
| 2005/0181204 A1 * | 8/2005 | Wang | B29C 37/0032 | 428/354 |
| 2006/0108058 A1 | 5/2006 | Chapman | | |
| 2007/0202762 A1 * | 8/2007 | Hirawaki | B29C 70/088 | 264/642 |
| 2008/0008836 A1 * | 1/2008 | Kipp | B29C 33/56 | 425/96 |
| 2008/0145624 A1 * | 6/2008 | Weikard | C08G 18/022 | 264/447 |
| 2009/0014081 A1 * | 1/2009 | Limas | B29C 70/32 | 264/102 |
| 2009/0061215 A1 * | 3/2009 | Baumgart | B29C 37/0032 | 427/133 |
| 2009/0208757 A1 * | 8/2009 | Baumgart | B29C 37/0032 | 428/422.8 |
| 2010/0009210 A1 * | 1/2010 | Kitte | B05D 3/029 | 264/447 |
| 2011/0095574 A1 * | 4/2011 | Brown | B32B 9/046 | 156/290 |
| 2011/0136985 A1 * | 6/2011 | Moon | B29C 33/64 | 264/338 |
| 2011/0297308 A1 * | 12/2011 | Makin | B32B 5/024 | 156/245 |
| 2011/0308714 A1 * | 12/2011 | Sander | B29C 70/54 | 156/243 |
| 2012/0202071 A1 * | 8/2012 | Kaneko | C08J 5/249 | 428/413 |
| 2012/0312459 A1 * | 12/2012 | De Mattia | B29C 70/30 | 156/481 |
| 2013/0036922 A1 * | 2/2013 | Stewart | B30B 5/02 | 100/211 |
| 2013/0125740 A1 * | 5/2013 | Kang | F16F 1/025 | 87/23 |
| 2013/0149934 A1 * | 6/2013 | Sang | B32B 27/286 | 252/500 |
| 2014/0265058 A1 * | 9/2014 | Gautier | B29C 31/08 | 264/553 |
| 2014/0370318 A1 * | 12/2014 | Stephen | C08G 61/08 | 524/774 |
| 2015/0151796 A1 * | 6/2015 | Berger | B29C 70/68 | 296/193.06 |
| 2015/0352818 A1 * | 12/2015 | Glotin | B29C 66/712 | 156/245 |
| 2015/0360426 A1 * | 12/2015 | Radanitsch | B29C 70/547 | 264/78 |
| 2016/0031135 A1 * | 2/2016 | Hicks | B29C 45/0001 | 264/279 |
| 2016/0075105 A1 * | 3/2016 | Lamberty | B32B 15/14 | 156/196 |
| 2016/0082710 A1 * | 3/2016 | Coxon | B29C 70/44 | 156/60 |
| 2016/0121553 A1 * | 5/2016 | Paesano | B29C 70/541 | 264/258 |
| 2016/0361910 A1 * | 12/2016 | Franck, III | B29C 65/02 | |
| 2017/0157804 A1 * | 6/2017 | Takemoto | B29C 37/0028 | |
| 2017/0210053 A1 * | 7/2017 | Osborne | B29C 66/73941 | |
| 2017/0239895 A1 * | 8/2017 | Takehara | B32B 3/266 | |
| 2019/0176411 A1 * | 6/2019 | Kiel Sørensen | F16B 11/006 | |
| 2020/0247018 A1 * | 8/2020 | El Fouzari | B29C 37/0032 | |
| 2021/0060607 A1 * | 3/2021 | Brei | B29C 70/086 | |
| 2021/0170701 A1 * | 6/2021 | Zhao | B32B 27/12 | |

FOREIGN PATENT DOCUMENTS

| | | |
|---|---|---|
| DE | 10 2006 048 921 | 4/2008 |
| EP | 0 228 952 | 7/1987 |
| FR | 2 772 301 | 6/1999 |
| WO | 94/07674 | 4/1994 |

* cited by examiner

PROCESS FOR IN-MOLD COATING OF COMPOSITE AIRCRAFT COMPONENTS

CROSS-REFERENCE TO RELATED APPLICATIONS

This application is a continuation-in-part (CIP) of commonly owned U.S. application Ser. No. 16/907,931 filed on Jun. 22, 2020, the entire contents of which are expressly incorporated hereinto by reference.

FIELD

The embodiments disclosed herein relate generally to process for forming composite aircraft components, i.e., aircraft components formed of a cured fiber-reinforced resin. According to specific embodiments, a finished surface of the composite aircraft component can be achieved by providing in-mold coating of the cured fiber-reinforced resin to thereby achieve a composite aircraft component having an exterior surface that does not necessarily require further finishing.

BACKGROUND

Composite materials formed of a cured fiber-reinforced resin material (e.g., cured carbon fiber reinforced epoxy) are well known in the fabrication of components for aircraft, e.g., flaps, ailerons, wing fuselage fairings, vertical and horizontal stabilizers, covers, interior parts and the like. Such components must however be painted in order to protect against the external environment, e.g., humidity, liquid leakage and the like.

One drawback to the use of composite materials is that they possess surface porosities due to the inherent nature of the conventional manufacturing processes. Aircraft components formed of a composite material must undergo pre-finish steps whereby a suitable filler material, e.g., pore filler, polyester filler or primer filler, is applied in order to correct surface defects and thereby obtain parts with the required smooth and aerodynamic surfaces. Such pre-finish steps will thereby necessarily increase production times and costs as well as expose operators to ergonomic issues since the filler material must be sanded to obtain the necessary surface quality for paint application.

It would therefore be highly desirable if composite aircraft components could be fabricated which avoid the pre-finish steps of the prior art processes. It is towards fulfilling such a need that the embodiments disclosed herein are directed.

SUMMARY

Generally, the embodiments disclosed herein are directed toward a process whereby aircraft parts fabricated from a composite material (e.g., a cured fiber-reinforced resin material) may be subject to in-mold coating so that the cured component will exhibit the desired finished external surface when removed from the component mold.

According to specific embodiments, a process for making a fiber-reinforced composite aircraft component is provided whereby a contoured mold is provided so that a layer of a water-based primer paint may be applied onto an interior surface of the mold. The primer paint material is subsequently allowed to dry (e.g., by allowing volatile material of the paint to evaporate) to form a dried film layer of the primer on the interior surface of the mold. Thereafter, one or more prepreg plies of fiber reinforced uncured resin may be laid-up onto the cured primer layer to provide a component preform comprised of (i) the dried film layer of the primer paint material on the interior surface of the mold and (ii) the one or more prepreg plies in contact with the dried film layer of the primer paint material. The resulting component preform in the mold may then be subjected to resin curing conditions (e.g., by enveloping the component preform in a vacuum bag and subjecting the component preform to elevated temperature and pressure conditions within an autoclave) sufficient to cure the one or more prepreg plies and to bond the prepreg layers to the dried film layer of the primer paint material and thereby form the composite aircraft component. Upon removal of the composite aircraft component from the mold, the dried film layer of primer paint material will thereby form a finished surface of the composite aircraft component.

According to certain embodiments, the water-based primer paint material may be an aqueous epoxy paint capable of being sprayed onto the interior mold surface. The prepreg layers may comprise reinforcement fibers selected from the group consisting of carbon, glass or aramid fibers impregnated with a curable resin, e.g., a curable epoxy resin.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which.

DETAILED DESCRIPTION OF EMBODIMENTS

Figure 1:
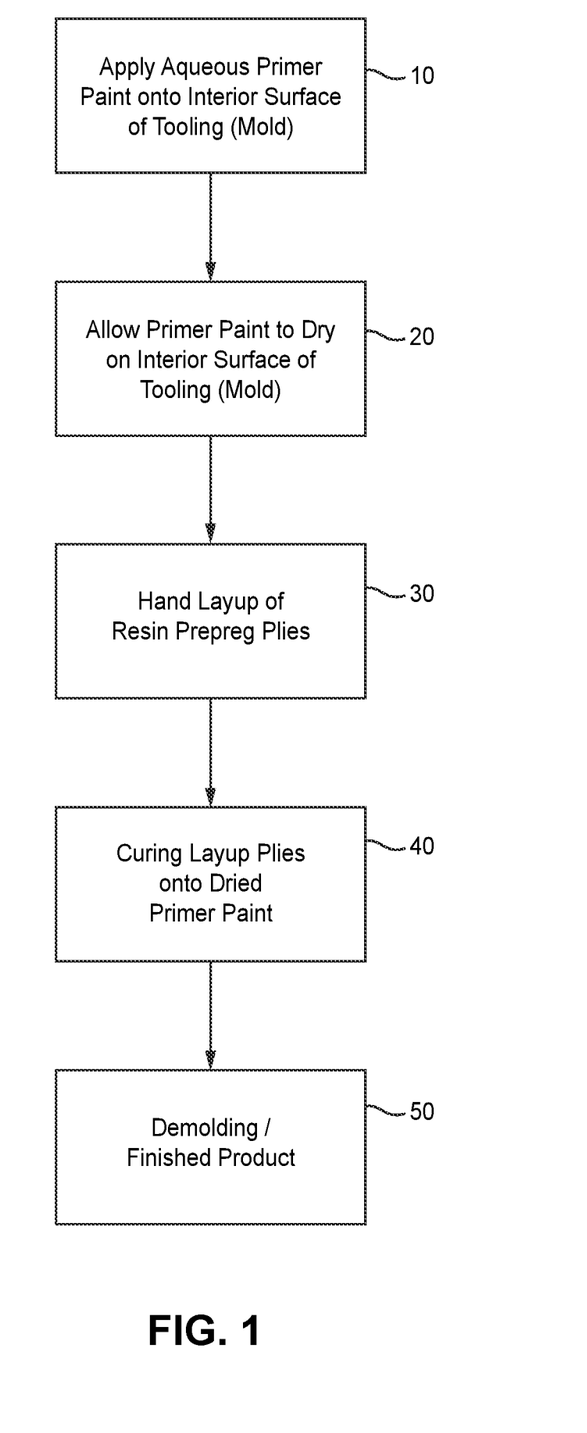
FIG. 1 is a schematic diagram depicting the steps according to an embodiment of the process according to the present invention.
Figure 2:
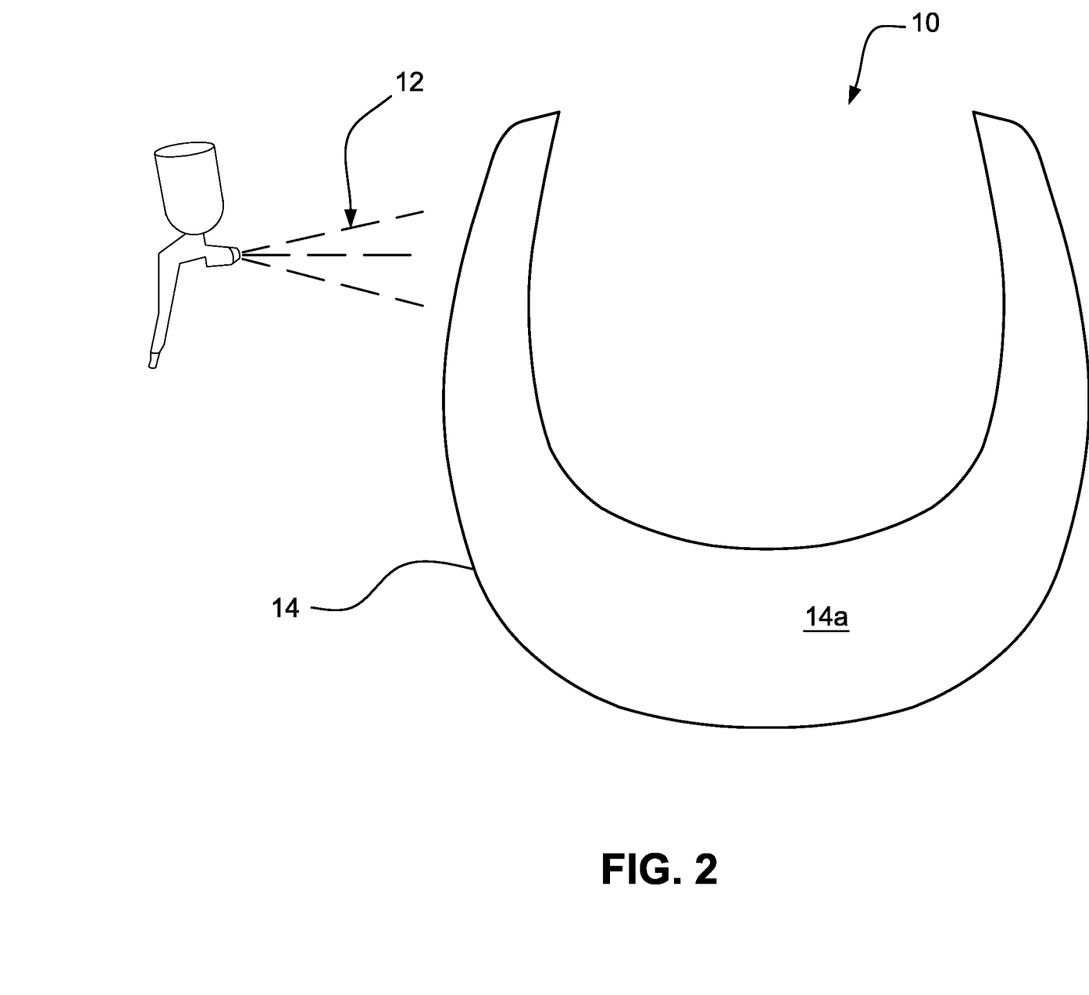
FIG. 2 is a schematic view of the application of a curable primer onto an interior surface of a component mold.

As is shown in FIG. 1 an embodiment of the process according to this invention involves a step 10 whereby a water-based primer paint material is applied onto the interior surface of a suitably configured mold (tooling) 14 (see FIG. 2). As is shown in accompanying FIG. 2 the step 10 is depicted as being conducted such that the water-b based primer paint material 12 is sprayed onto the interior surface 14a of the mold 14.

The primer paint material 12 shall be any suitable material compatible with the fiber reinforced polymeric materials that are subsequently laid-up thereon. For example, the primer paint material 12 can be a water-based curable epoxy polymeric resin which contains pigments and other additives (binders, fillers, UV inhibitors and the like) important for the resistance of the external surface of the finished component, such as chemicals, ultraviolet radiation, corrosive fluids and the like. The aqueous primer paint material will therefore present low levels of volatile organic compounds (VOCs) and, as compared to organic solvent-based paints, is thus environmentally friendly with minimal (if any) adverse effects on operators applying the paint.

Once a suitable layer thickness of between about 60 μm to about 120 μm of the water-based primer paint material is applied onto the interior surface 14a of the mold 14, the applied paint on the interior mold surface is allowed to dry according to step 20. More specifically, the applied primer paint layer in step 20 is allowed to air dry at room temperature of between about 20° C. to about 25° C. and a maximum relative humidity (RH) of about 85% for about 1 hour (flash off period) to cause evaporation of the volatile material (e.g., water) prior to placement in an oven to accelerate the paint curing as discussed below.

Figure 3:
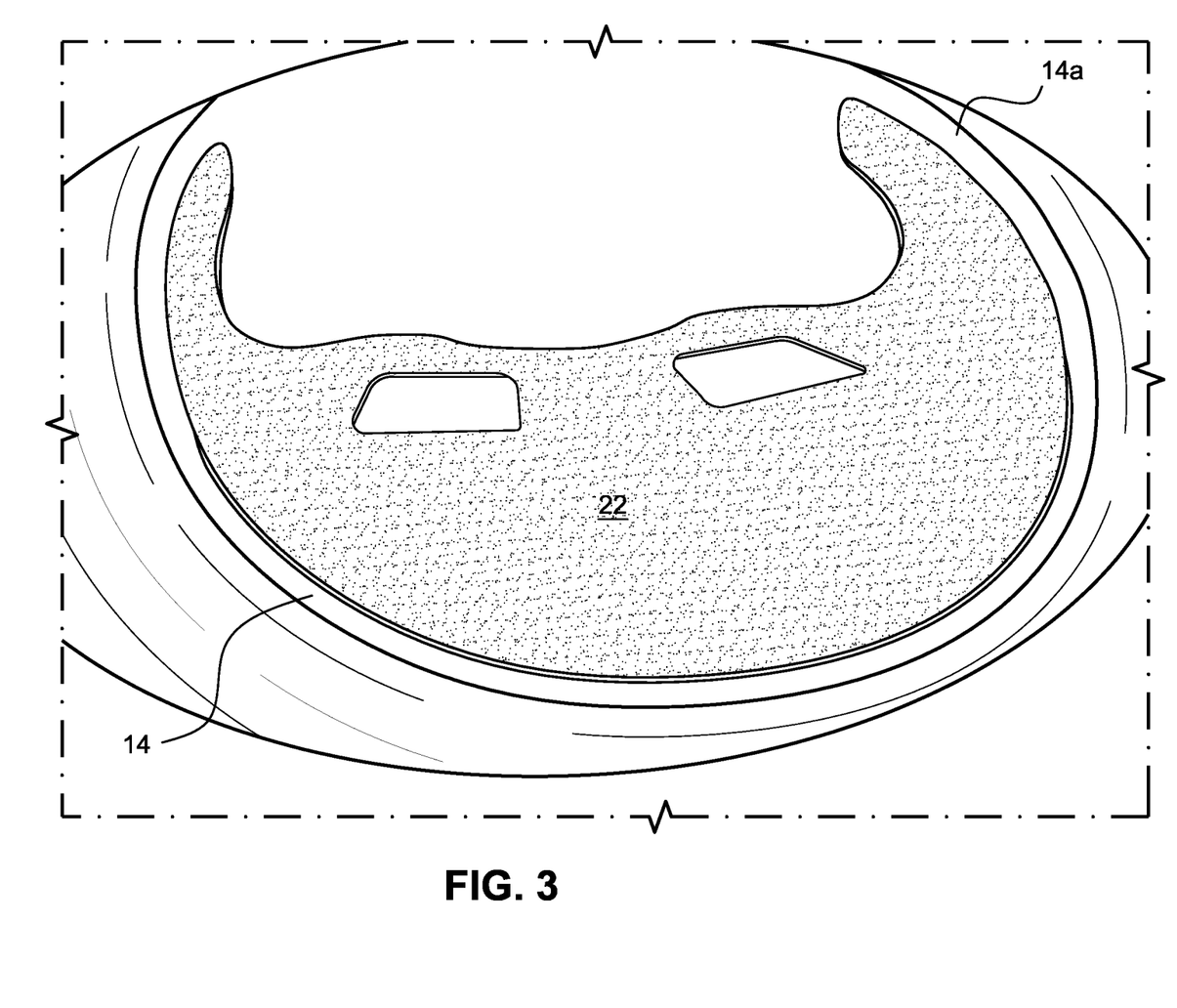
FIG. 3 is a schematic view of the component mold depicted in FIG. 2 with a cured layer of the primer on the interior surface thereof.

In order to accelerate the complete curing of the primer paint layer, the mold 14 with the applied and initially dried layer of the primer paint material sprayed thereon may be exposed to an elevated temperature of between about 60° C. to about 70° C., for a time period of about 30 minutes to about 1 hour. The mold 14 containing the layer of the dried and complete cured primer paint material (now designated as reference numeral 22) on the interior surface 14a of the mold 14 is depicted in accompanying FIG. 3.

Figure 4:
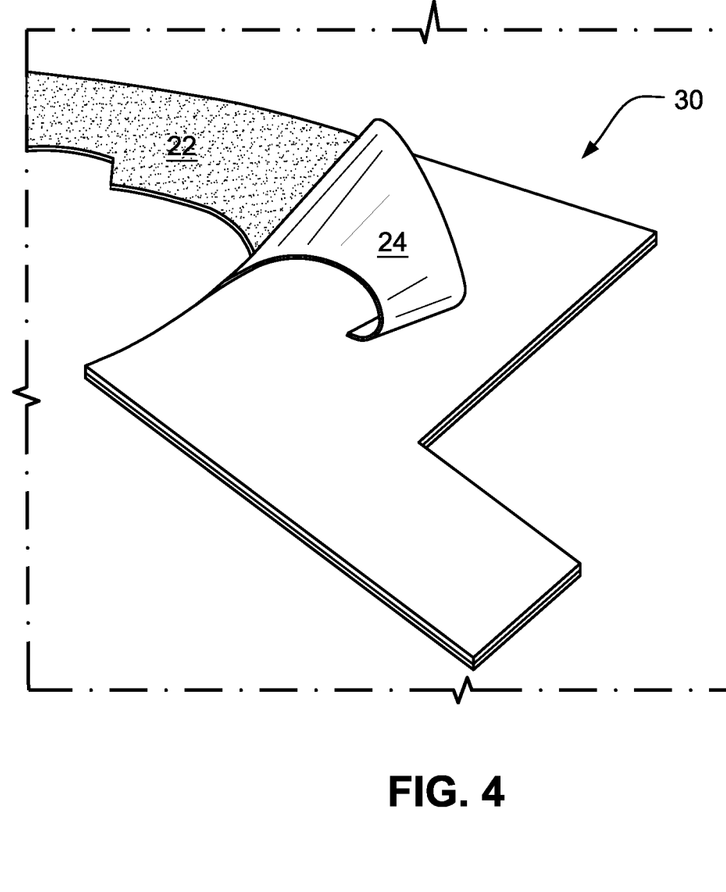
FIG. 4 is a schematic view showing the lay-up of curable fiber-reinforced polymeric sheets onto the cured layer of the primer of the component mold depicted in FIG. 3.

The dried and cured layer 22 of the primer paint material is maintained on the interior surface of the mold 14 so that operators can then apply in step 30 one or more layers or plies 24 of fiber-reinforced composite sheets. Such a lay-up procedure is schematically depicted in FIG. 4. As noted above, the uncured composite plies that may be employed according to the embodiments disclosed herein may be comprised of uncured (or partially cured) resin pre-impregnated carbon, glass or aramid fibers (i.e., so called "prepregs" in art parlance). The fibers of the prepreg plies will typically be oriented unidirectionally with respect to one another. In practice, therefore, there are typically several individual plies of curable fiber-reinforced prepregs 24 with adjacent layers being laid such that the fiber direction of one plie is biased or at an angle with respect to the fiber directions in adjacent plies so as to enhance strength of the resulting component. The curable fiber-reinforced prepregs 24 are laid up so as to achieve a desired thickness according to the design of the particular component being constructed.

Figure 5:
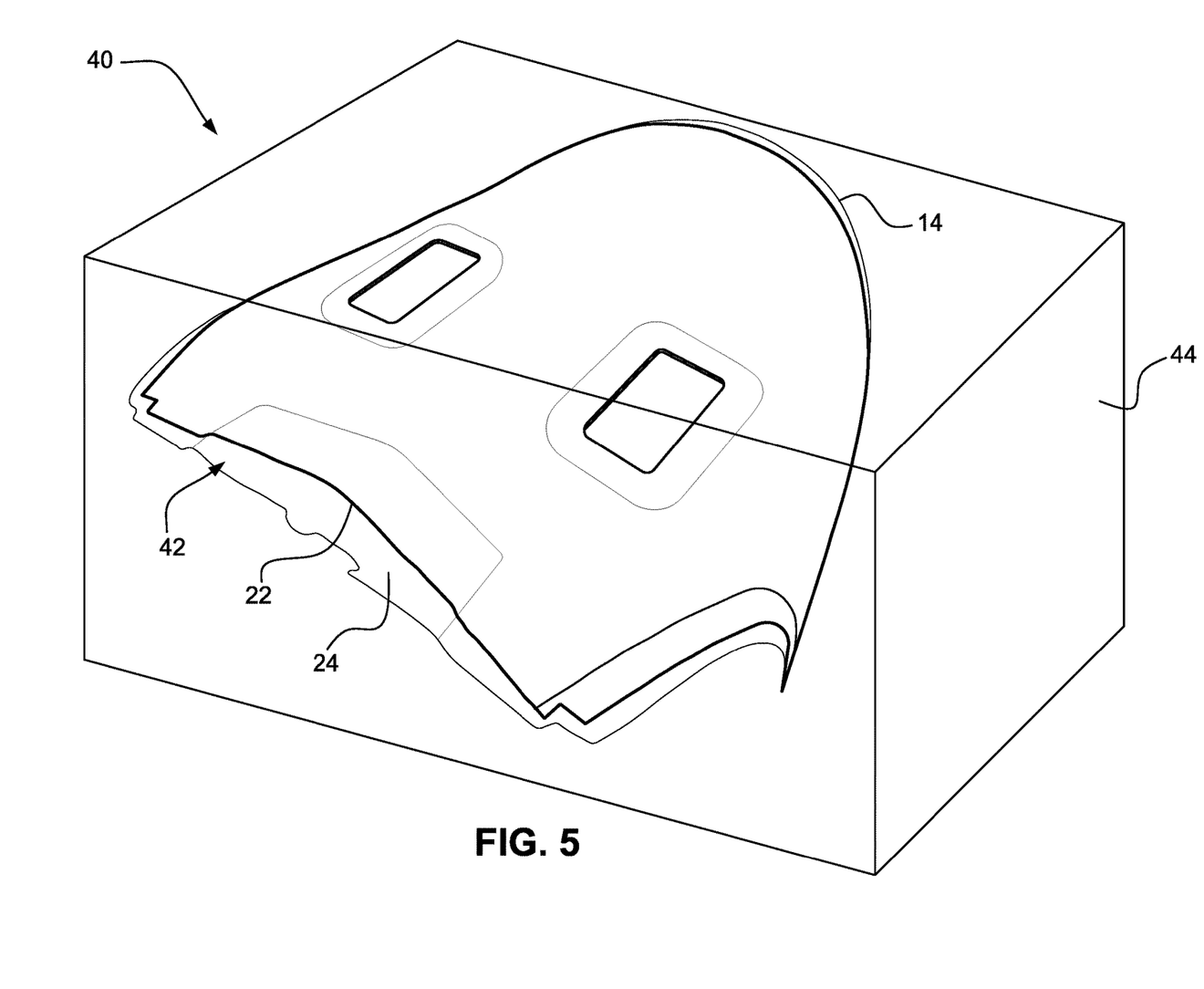
FIG. 5 schematically depicts the component mold having layers of fiber-reinforced polymeric sheets laid up on the cured layer of the primer being subject to curing in a curing oven.

The preform designated by reference numeral 42 in FIG. 5 comprised of the mold 14, the dried and cured film layer 22 of the primer paint material and the curable prepreg plies 24 may then be placed within an autoclave curing oven 44 in step 40. Curing of the prepreg plies 24 is therefore accomplished under suitable resin curing conditions of elevated temperature and pressure to achieve full curing of the resin in the prepreg plies 24 and thereby bond the plies one to another and to the cured primer layer 22. By way of example, the preform 42 may be placed within a vacuum bag such that the preform 42 within the vacuum bag may be subjected to resin curing conditions under vacuum within an autoclave whereby the prepreg plies 24 and the dried and cured film layer 22 of the primer paint material are exposed to elevated temperature conditions within a range of about 180° C. (+/−10° C.) and elevated pressure conditions in a range of about 95 psi (+/−5 psi), i.e., between about 90 psi to about 100 psi.

Figure 6:
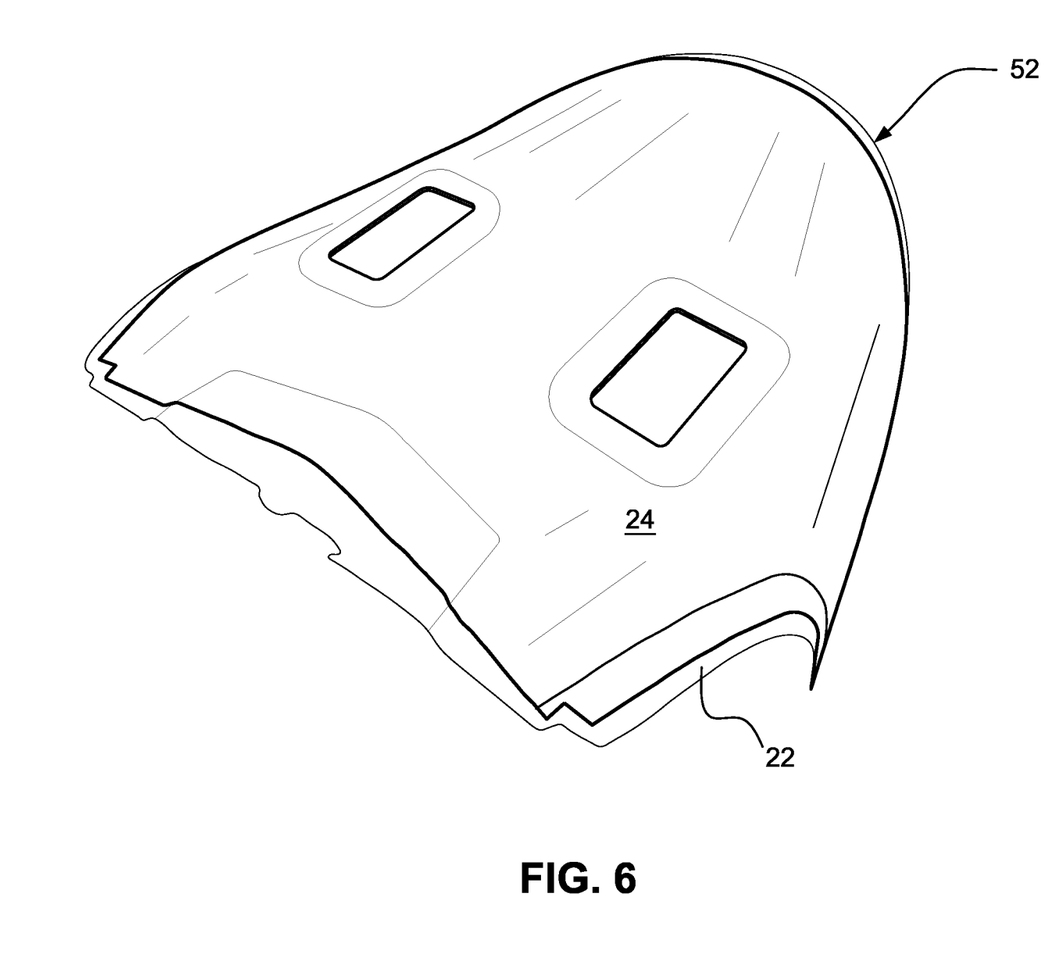
FIG. 6 schematically shows the cured component de-molded from the component mold.

After cooling and removal from the autoclave and vacuum bag, a finished component designated by reference numeral 52 in FIG. 6 is achieved by the demolding step 50 by removing the finished component 52 from the mold 14. Demolding may be further facilitated by optionally providing a mold release agent, e.g., a non-perforated release film, on the interior surface of the mold 14. If a mold release agent is provided, therefore, it can be readily removed from the dried and cured layer of the primer paint material upon demolding of the finished component 52. When demolded, therefore the component 52 will include a finished external surface comprised of the dried and cured layer of the primer paint layer 22 which is bonded onto a surface of the cured prepreg plies 24 thereof. As such, the component 52 will not possess the typical defects associated with conventional processes but instead will have a finished exterior surface provided by the primer paint layer 22 that does not necessarily require the application of any fillers and subsequent sanding. Additionally, the dried and cured primer paint layer 22 will not necessarily need to be subsequently painted if it contains suitable pigment coloring needed for the finished component 52.

While reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. A process for making a fiber-reinforced composite aircraft component having a finished exterior surface formed of a pre-cured primer coating, wherein the process comprises the steps of:
   (a) providing a contoured mold defining an interior mold surface;
   (b) spraying a water-based epoxy primer paint material onto an interior mold surface to form a coating layer of the water-based epoxy primer paint material on the interior mold surface;
   (c) precuring the coating layer to thereby form a precured film layer of the primer paint material on the interior mold surface by:
      (c1) allowing the water to evaporate from the coating layer of the water-based primer paint material at room temperature of between about 20° C. to about 25° C. during an initial flash off time period sufficient to form a dried layer of the water-based primer paint material; and thereafter
      (c2) exposing the dried layer of the water-based primer paint material during a subsequent curing time period to an elevated temperature of about 60° C. to about 70° C. to thereby form a precured film layer of primer paint material;
   (d) laying-up one or more uncured prepreg plies of fiber reinforced uncured resin on the precured film layer of the primer paint material to provide a component preform comprised of (i) the precured film layer of the primer paint material on the interior mold surface and (ii) the one or more uncured prepreg plies in contact with the precured film layer of the primer paint material;
   (e) enveloping the component preform in a vacuum bag to provide an autoclavable component preform in the mold;
   (f) placing the autoclavable component preform under vacuum within the bag into an autoclave and subjecting the autoclavable component preform in the mold while under vacuum within the vacuum bag to resin curing conditions within the autoclave at an elevated temperature condition in a range of about 180° C. (+/−10° C.) and at an elevated pressure condition in a range of about 95 psi (+/−5 psi) sufficient to cure the uncured resin in the one or more uncured prepreg plies to form cured prepreg plies and to bond the cured prepreg plies to the precured film layer of the primer paint material and thereby form the fiber-reinforced composite aircraft component; and (g) removing the fiber-reinforced composite aircraft component from the mold such that the precured film layer of the primer paint material forms a cured finished exterior surface of the fiber-reinforced composite aircraft component.

2. The process according to claim 1, wherein step (g) comprises:
(g1) allowing the fiber reinforced composite aircraft component in the mold to cool, and thereafter
(g2) removing the fiber reinforced composite aircraft component from the mold.

3. The process according to claim 1, wherein prior to step (a) there is practiced a step of applying a mold release agent onto the interior mold surface.

4. The process according to claim 3, wherein the mold release agent comprises a non-perforated release film.

5. The process according to claim 1, wherein the step (b) is practiced to form a thickness of the coating layer of the water-based primer paint material on the interior mold surface of between about 60 μm to about 120 μm.

6. The process according to claim 1, wherein the one or more uncured prepreg plies comprise reinforcement fibers selected from the group consisting of carbon, glass or aramid fibers impregnated with a curable resin.

7. The process according to claim 6, wherein the one or more uncured prepreg plies comprise carbon fibers impregnated with a curable epoxy resin.

8. The process according to claim 1, wherein the initial flash off time period of step (c1) is about 1 hour.

9. The process according to claim 8, wherein step (c1) comprises exposing the layer of the water-based primer paint material to room temperature at a maximum relatively humidity (RH) of about 85%.

10. The process according to claim 1, wherein step (c2) comprises placing the mold with the dried coating layer of the aqueous primer paint material on the interior mold surface in a drying oven.

11. The process according to claim 1, wherein the subsequent curing time period of step (c2) is about 30 minutes to about 1 hour.

* * * * *